United States Patent
Ishizaka (10) Patent No.: US 8,934,179 B2
(45) Date of Patent: Jan. 13, 2015

(54) IMAGING LENS

(71) Applicant: Kantatsu Co., Ltd., Yaita-shi, Tochigi (JP)

(72) Inventor: Tohru Ishizaka, Sukagawa (JP)

(73) Assignee: Kantatsu Co., Ltd., Tochigi (JP)

( * ) Notice: Subject to any disclaimer, the term of this patent is extended or adjusted under 35 U.S.C. 154(b) by 28 days.

(21) Appl. No.: 13/853,359

(22) Filed: Mar. 29, 2013

(65) Prior Publication Data

US 2013/0265651 A1 Oct. 10, 2013

(30) Foreign Application Priority Data

Apr. 4, 2012 (JP) .................................. 2012-085263

(51) Int. Cl.
*G02B 9/60* (2006.01)
*G02B 13/18* (2006.01)
*G02B 13/00* (2006.01)

(52) U.S. Cl.
CPC .............. *G02B 13/0045* (2013.01); *G02B 9/60* (2013.01)
USPC .......................................... 359/714; 359/764

(58) Field of Classification Search
CPC .............. G02B 9/00; G02B 9/60; G02B 9/62; G02B 9/64; G02B 13/18; G02B 13/0045
USPC .......................... 359/714, 754–758, 763–766
See application file for complete search history.

(56) References Cited

U.S. PATENT DOCUMENTS

| | | | | |
|---|---|---|---|---|
| 7,864,545 B2* | 1/2011 | Kim et al. | ..................... | 361/807 |
| 8,000,030 B2* | 8/2011 | Tang | .............................. | 359/714 |
| 2010/0134904 A1* | 6/2010 | Tsai | ............................... | 359/764 |
| 2012/0218647 A1* | 8/2012 | Yonezawa et al. | ............. | 359/714 |
| 2012/0257287 A1* | 10/2012 | Huang | ........................... | 359/714 |
| 2013/0057966 A1* | 3/2013 | Tsai et al. | ..................... | 359/714 |

FOREIGN PATENT DOCUMENTS

JP 2009-294528 A 12/2009
JP 2010-026434 A 2/2010

* cited by examiner

*Primary Examiner* — Darryl J Collins
(74) *Attorney, Agent, or Firm* — Westerman, Hattori, Daniels & Adrian, LLP (57) ABSTRACT

An imaging lens includes five lenses for a solid-state image sensor, arranged in order from the object side to the image side, a first lens with positive refractive power having a convex object side surface, a second lens with negative refractive power having a concave image side surface, a third lens with positive or negative refractive power, a fourth lens with positive refractive power as a double-sided aspheric lens having a concave image side surface near an optical axis, and a fifth lens with negative refractive power as a double-sided aspheric lens having a concave image side surface near the optical axis, wherein the first lens and second lens satisfy conditional expressions below:

$$45 < v1 < 90 \quad (1)$$

$$22 < v2 < 35 \quad (2)$$

$$2.0 < v1/v2 < 2.6 \quad (3)$$

where
$v1$: first lens Abbe number
$v2$: second lens Abbe number.

14 Claims, 8 Drawing Sheets

IMAGING LENS

The present application is based on and claims priority of Japanese patent application No. 2012-085263 filed on Apr. 4, 2012, the entire contents of which are hereby incorporated by reference.

BACKGROUND OF THE INVENTION

1. Field of the Invention

The present invention relates to imaging lenses which form an image of an object on a solid-state image sensor such as a CCD sensor or C-MOS sensor used in a compact image pickup device and more particularly to imaging lenses composed of five lenses which are built in image pickup devices mounted in mobile terminals such as mobile phones and smart phones, which are becoming increasingly compact and thin, and PDAs (Personal Digital Assistances), game machines and information terminals such as PCs.

2. Description of the Related Art

In recent years, the market of mobile terminals with an image pickup device has been expanding increasingly. Today, most of such mobile terminals have a camera function. Nowadays, as for the camera performance of these mobile terminals, a high pixel density camera function comparable to a digital still camera is becoming mainstream. Furthermore, for the reasons of convenience and appearance, the demand for thinner models is growing, leading to a stronger need for smaller and thinner built-in image pickup devices. With this background, an imaging lens built in an image pickup device using a high pixel density image sensor is expected to provide higher resolution and be more compact and thinner and also to be a fast lens (namely a lens with a small F-value). At the same time, the imaging lens is strongly anticipated to provide a wide angle of view so that an image of a wide object can be taken.

Generally an imaging lens which copes with the need for compactness, thinness, and high performance is composed of a plurality of lenses. Conventionally, in order to deal with VGA up to 1 megapixel, an imaging lens composed of two or three lenses has been widely used for its advantage in terms of size and cost. Also, many types of imaging lenses composed of four lenses which are intended to cope with the need for an increase in the number of pixels have been proposed. Recently, imaging lenses composed of five lenses which can provide higher performance than those composed of four lenses have also been proposed in order to cope with the need for compactness and increase in the number of pixels as mentioned above. The present invention provides an imaging lens which is composed of five lenses to meet the above needs.

JP-A-2009-294528 (Patent Document 1) discloses an imaging lens composed of five lenses which are arranged in order from the object side as follows: a first lens with positive power having a convex surface on the object side, an aperture stop, a second lens with a meniscus shape near the optical axis, a third lens having a convex surface on the image side near the optical axis, a fourth lens in which both surfaces are aspheric and the peripheral area of the image side surface is convex, and a fifth lens in which both surfaces are aspheric and the peripheral area of the image side surface is convex, and among the second to fifth lenses there is only one negative lens with an Abbe number of 30 or less.

JP-A-2010-026434 (Patent Document 2) discloses an imaging lens composed of five lenses in which a positive first lens, a positive second lens, a negative third lens, a positive fourth lens, and a negative fifth lens are arranged in order from the object side.

The imaging lens described in Patent Document 1 has a ratio of total track length (TTL) to maximum image height (IH) (TTL/2IH) of about 1.0, so it is relatively compact. However, since its F-value is about 3.0, therefore, the imaging lens is not considered to provide enough brightness to cope with the increasing trend toward image sensors with a larger number of pixels. Although the imaging lens described in Patent Document 2 is a lens system which has an F-value of 2.05 to 2.5 to ensure sufficient brightness and provides high aberration correction capability, the power of its first lens is weak, so it is disadvantageous in order to achieve thinness.

SUMMARY OF THE INVENTION

The present invention has been made in view of the above problem and has an objective to provide an imaging lens composed of five lenses which can achieve compactness and thinness, has a small F-value and corrects various aberrations properly and provides a relatively wide angle of view and also meets the need for cost reduction.

According to an aspect of the present invention, there is provided an imaging lens composed of five lenses which are arranged in order from the object side to the image side as follows: a first lens with positive refractive power having a convex surface on the object side and a second lens with negative refractive power having a concave surface on the image side. The first lens and the second lens satisfy conditional expressions (1), (2), and (3) below:

$$45 < v1 < 90 \qquad (1)$$

$$22 < v2 < 35 \qquad (2)$$

$$2.0 < v1/v2 < 2.6 \qquad (3)$$

where
$v1$: Abbe number of the first lens
$v2$: Abbe number of the second lens.

Further arranged are a third lens with positive or negative refractive power, a fourth lens with positive refractive power having a concave surface on the image side near an optical axis, and a fifth lens with negative refractive power having a concave surface on the image side near the optical axis. The both surfaces of the fourth and fifth lenses are aspheric (double-sided aspheric lenses).

In the imaging lens configured as mentioned above, among the five constituent lenses, the first lens has a strong positive refractive power so as to facilitate shortening of the total track length, and the second and fifth lenses have negative refractive power surfaces which have a diffuse effect to facilitate proper correction of aberrations on the image plane including the peripheral area. Also, the fourth lens is a lens with positive refractive power having a concave surface on the image side, so as to ensure an appropriate back focus. The both surfaces of the fourth lens and fifth lens have adequate aspheric shapes to control the angle of light rays incident on the image sensor.

The conditional expression (1) defines the Abbe number of the first lens and the conditional expression (2) defines the Abbe number of the second lens and these expressions both indicate conditions to correct chromatic aberration properly. If the Abbe number of the first lens is below the lower limit in the conditional expression (1) and if the Abbe number of the second lens is above the upper limit in the conditional expression (2), the difference between the variance values of the first lens and second lens would be smaller, resulting in insufficient correction of chromatic aberration. If the Abbe number of the first lens is above the upper limit in the conditional expression (1) and if the Abbe number of the second lens is below the lower limit in the conditional expression (2), the balance between axial chromatic aberration and chromatic aberration of magnification would deteriorate, resulting in performance decrease in the peripheral area. When both the conditional expressions (1) and (2) are satisfied and the Abbe number ratio is within the range indicated in the conditional expression (3), chromatic aberration is able to be corrected properly.

Preferably the imaging lens according to the present invention satisfies a conditional expression (4) below:

$$0.6 < f1/f < 0.9 \quad (4)$$

where f represents the focal length of the overall optical system of the imaging lens and f1 represents the focal length of the first lens.

The conditional expression (4) defines the positive power of the first lens relative to the power of the overall optical system and indicates a condition to achieve compactness and correct aberrations properly. If the ratio is above the upper limit in the conditional expression (4), the positive power of the first lens relative to the power of the overall optical system would weaken, which would lead to a disadvantage in shortening the total track length. On the other hand, if it is below the lower limit, undesirably the power of the first lens would be too strong, making it difficult to correct aberrations and causing an increase in manufacturing tolerance sensitivity.

Preferably the imaging lens according to the present invention satisfies a conditional expression (5) below:

$$-1.0 < f2/f < -0.8$$

where f2 represents the focal length of the second lens.

The conditional expression (5) defines the negative power of the second lens relative to the power of the overall optical system and indicates a condition to ensure that spherical aberration, coma aberration, and axial chromatic aberration are corrected properly.

If the ratio is above the upper limit in the conditional expression (5), it would be difficult to correct spherical aberration and coma aberration. On the other hand, if it is below the lower limit in the conditional expression (5), the negative power of the second lens would be too weak, making it difficult to correct axial chromatic aberration.

Preferably, in the imaging lens according to the present invention, an aperture stop is located on the object side of the first lens. By locating the aperture stop on the object side of the first lens, the exit pupil can be set away from the image plane, and consequently, the angle of light rays incident on the image sensor can be restrained adequately to ensure a good telecentricity on the image side.

Here the aperture stop located on the object side of the first lens is in either of the following two ways: it is located nearer toward the object and farther from the point where the object side surface of the first lens crosses the optical axis, or it is located anywhere in the area from the point where the object side surface of the first lens crosses the optical axis to the peripheral edge thereof.

In the imaging lens according to the present invention, preferably the fourth lens and the fifth lens have a meniscus shape with a concave surface on the image side near the optical axis and have a pole-change point other than on the optical axis on their object side surface and image side surface. Due to this aspheric shape, field curvature can be properly corrected while the angle of light rays incident on the image sensor is restrained to enhance telecentricity. "Pole-change point" here means a point on an aspheric surface where a tangential plane crosses the optical axis perpendicularly.

Preferably the imaging lens according to the present invention satisfies a conditional expression (6) below:

$$1.1 < TTL/f < 1.3 \quad (6)$$

where TTL represents the distance on the optical axis from the imaging lens' surface nearest to the object side to the image plane without the filter being placed.

The conditional expression (6) defines the ratio of the total track length to the focal length of the overall optical system and indicates a condition to shorten the total track length and correct various aberrations properly.

If the ratio is above the upper limit in the conditional expression (6), it would facilitate correction of various aberrations due to increased freedom in shaping of each lens; however, it leads to a longer total track length, creating difficulty in achieving thinness. On the other hand, if the ratio is below the lower limit in the conditional expression (6), the total track length would be too short and it leads to reduction of the freedom in shaping of each lens, making it difficult to correct various aberrations.

Preferably the imaging lens according to the present invention satisfies a conditional expression (7) below:

$$-0.40 < r1/r2 < -0.08 \quad (7)$$

where r1 represents the curvature radius of the object side surface of the first lens and r2 represents the curvature radius of the image side surface of the first lens.

The conditional expression (7) defines the shape of the first lens near the optical axis and indicates a condition to shorten the total track length and suppress spherical aberration.

If the ratio is above the upper limit in the conditional expression (7), the power of the object side surface of the first lens would be stronger than the power of its image side surface, undesirably resulting in increased spherical aberration. On the other hand, if the ratio is below the lower limit in the conditional expression (7), the power of the object side surface of the first lens would be too weak as compared with the power of its image side surface, which would be disadvantageous in shortening the total track length.

Preferably the imaging lens according to the present invention satisfies a conditional expression (8) below:

$$1.6 < f4/f < 3.8 \quad (8)$$

where f4 represents the focal length of the fourth lens.

The conditional expression (8) defines the power of the fourth lens relative to the power of the overall optical system and indicates a condition to shorten the total track length while ensuring an adequate back focus.

If the ratio is above the upper limit in the conditional expression (8), the positive power of the fourth lens relative to the power of the overall optical system would weaken, which would make it easy to ensure an adequate back focus; however, it would bring a disadvantage in shortening the total track length. On the other hand, if the ratio is below the lower limit in the conditional expression (8), the positive power of the fourth lens relative to the power of the overall optical system would be too strong, and consequently, it would be advantageous in shortening the total track length; however, it would be difficult to ensure back focus.

Preferably the imaging lens according to the present invention satisfies a conditional expression (9) below:

$$-9.0 < f5/f < -1.4 \quad (9)$$

where f5 represents the focal length of the fifth lens.

The conditional expression (9) defines the negative power of the fifth lens relative to the power of the overall optical system.

If the ratio is above the upper limit in the conditional expression (9), the negative power of the fifth lens relative to the power of the overall optical system would be stronger, and consequently, it would be disadvantageous in shortening the total track length. On the other hand, if the ratio is below the lower limit in the conditional expression (9), the negative power of the fifth lens relative to the power of the overall optical system would be too weak, and consequently it would be advantageous in shortening the total track length; however, it would be difficult to correct distortion and field curvature.

In the imaging lens according to the present invention, preferably all the constituent lenses are made of plastic material. When all the lenses are made of plastic material, mass production at low cost is achievable. Specifically cycloolefin plastic material is used for the first lens, the third lens, the fourth lens, and the fifth lens and polycarbonate is used for the second lens.

DETAILED DESCRIPTION OF THE PREFERRED EMBODIMENTS

Next, the preferred embodiments of the present invention will be described in detail referring to the accompanying drawings. FIGS. 1, 3, 5, and 7 are views showing the general configurations of imaging lenses according to Embodiments 1 to 4 of the present invention respectively. Since all these Embodiments have the same basic lens configuration, the lens configuration of an imaging lens according to the present invention is explained below referring to the view of the Embodiment 1.

Figure 1:
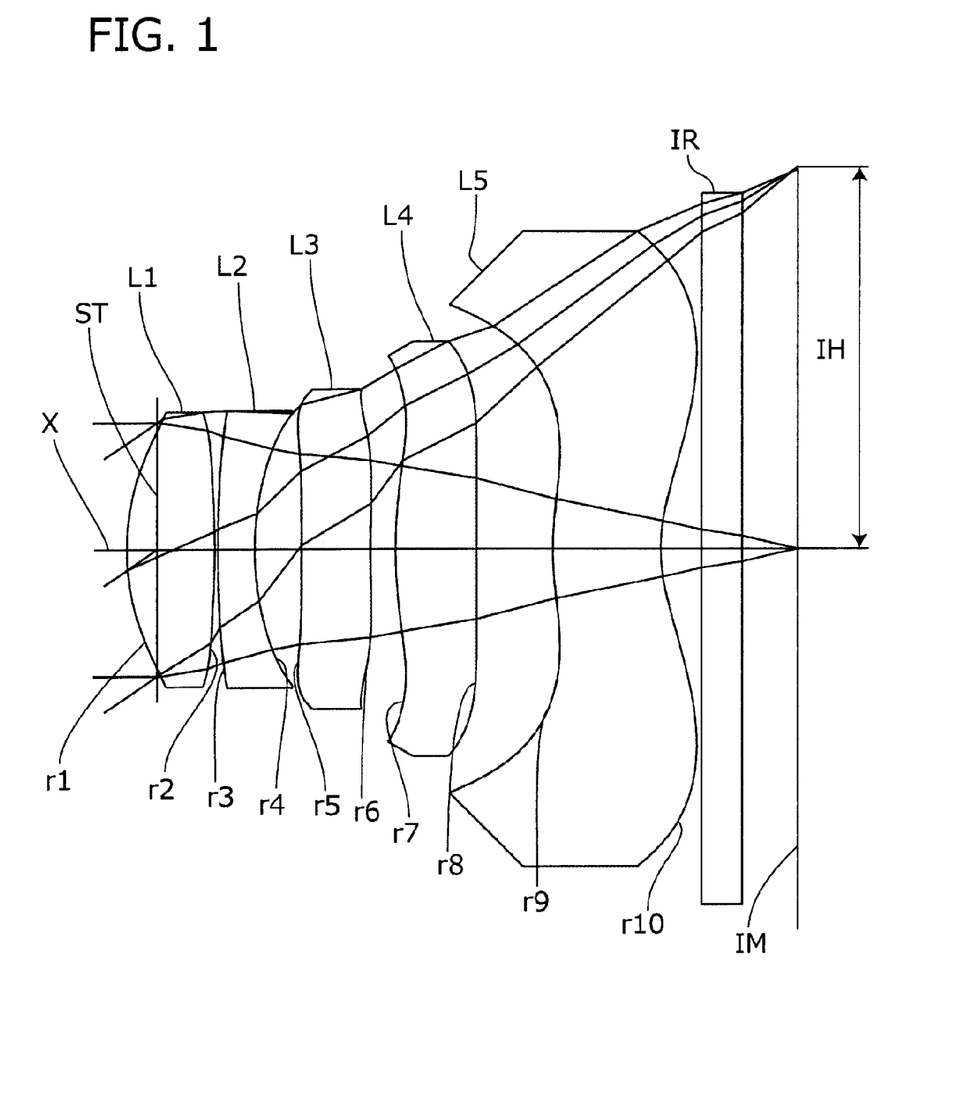
FIG. 1 is a view showing the general configuration of an imaging lens according to Embodiment 1 of the invention.

As shown in FIG. 1, in the imaging lens according to the present embodiment, lenses are arranged in the following order from the object side to the image side: a first lens L1 with positive refractive power, a second lens L2 with negative refractive power, a third lens L3 with positive or negative refractive power, a fourth lens L4 with positive refractive power, and a fifth lens L5 with negative refractive power. Aperture stop ST is located on the object side of the first lens L1. Filter IR is located between the fifth lens L5 and image plane IM. This filter IR is omissible.

In this imaging lens composed of five lenses, the first lens L1 is a biconvex lens in which the object side surface r1 and image side surface r2 are both convex; the second lens L2 is a meniscus lens in which the object side surface r3 is convex and the image side surface r4 is concave; the third lens L3 is a meniscus lens in which the object side surface r5 is convex near the optical axis X and the image side surface r6 is concave; the fourth lens L4 is a meniscus lens in which the object side surface r7 is convex near the optical axis X and the image side surface r8 is concave; and the fifth lens L5 is a meniscus lens in which the object side surface r9 is convex and the image side surface r10 is concave.

The third lens L3 is a lens which has weak positive power or negative power relative to the power of the overall optical system and in the Embodiment 1, it has negative power and in the Embodiments 2 to 4, it has positive power.

In this configuration, among the five constituent lenses L1 to L5, the first lens has a strong positive refractive power so as to facilitate shortening of the total track length, and the second and fifth lenses have negative refractive power surfaces with a diffuse effect to facilitate proper correction of aberrations on the image plane including the peripheral area. The third lens L3 has a weak positive or negative power and is mainly responsible for correction of off-axial aberrations. The both surfaces of the fourth lens L4 and fifth lens L5 have adequate aspheric shapes, thereby enhancing the telecentricity of light rays incident on the image sensor.

The imaging lenses according to the preferred embodiments of the invention are all made of plastic material. In all the Embodiments, cycloolefin plastic material is used for the first lens L1, third lens L3, fourth lens L4, and fifth lens L5 and polycarbonate is used for the second lens L2.

Since all the lenses are made of plastic material, stable mass production is attainable and cost reduction is easy. In addition, since the first lens L1, third lens L3, fourth lens L4, and fifth lens L5 are made of the same material, it is attainable to manufacture the imaging lens easily.

The imaging lens according to the present invention satisfies the following conditional expressions:

$$45 < v1 < 90 \quad (1)$$

$$22 < v2 < 35 \quad (2)$$

$$2.0 < v1/v2 < 2.6 \quad (3)$$

$$0.6 < f1/f < 0.9 \quad (4)$$

$$-1.0 < f2/f < -0.8 \quad (5)$$

$$1.1 < TTL/f < 1.3 \quad (6)$$

$$-0.40 < r1/r2 < -0.08 \quad (7)$$

$$1.6 < f4/f < 3.8 \quad (8)$$

$$-9.0 < f5/f < -1.4 \quad (9)$$

where:
v1: Abbe number of the first lens
v2: Abbe number of the second lens
f: focal length of the overall optical system of the imaging lens
f1: focal length of the first lens
f2: focal length of the second lens
f4: focal length of the fourth lens
f5: focal length of the fifth lens
TTL: distance on the optical axis from the object side surface of the first lens to the image plane without the filter
r1: curvature radius of the object side surface of the first lens
r2: curvature radius of the image side surface of the first lens In this embodiment, all the lens surfaces are aspheric. The aspheric shape of the lens surfaces is expressed by the following equation, where Z represents an axis in the optical axis direction, H represents height perpendicular to the optical axis, k represents conic constant, and A4, A6, A8, A10, A12, A14, and A16 represent aspheric surface coefficients:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, the imaging lenses according to the preferred embodiments of the invention will be explained. In each Embodiment, f represents the focal length of the overall optical system of the imaging lens, Fno represents F-number, ω represents half angle of view, and IH represents maximum image height. i represents a surface number counted from the object side, r represents curvature radius, d represents the distance between lens surfaces on the optical axis (inter-surface distance), Nd represents refractive index with respect to d-ray (reference wavelength), and νd represents Abbe number with respect to d-ray. An asterisk (*) after surface number i indicates that the surface is aspheric.

Embodiment 1

The basic lens data of the Embodiment 1 is shown below in Table 1.

TABLE 1

Unit mm
f = 4.160
Fno = 2.20
ω(°) = 34.49
IH = 2.856

| Surface No. i | Curvature radius r | Surface distance d | Refractive index Nd | Abbe No. νd |
|---|---|---|---|---|
| (Object surface) | Infinity | Infinity | | |
| Stop | Infinity | −0.225 | | |
| 1* | 1.754 | 0.655 | 1.535 | 56.16 |
| 2* | −5.259 | 0.025 | | |
| 3* | 18.175 | 0.270 | 1.635 | 23.91 |
| 4* | 2.111 | 0.350 | | |
| 5* | 49.667 | 0.516 | 1.535 | 56.16 |
| 6* | 9.971 | 0.187 | | |
| 7* | 3.479 | 0.605 | 1.535 | 56.16 |
| 8* | 21.778 | 0.573 | | |
| 9* | 2.402 | 0.800 | 1.535 | 56.16 |
| 10* | 1.334 | 0.3 | | |
| 11 | Infinity | 0.3 | 1.517 | 64.20 |
| 12 | Infinity | 0.607 | | |
| Image plane | Infinity | | | |

Single lens data

| Lens | Start plane | Focal length |
|---|---|---|
| 1 | 1 | 2.533 |
| 2 | 3 | −3.746 |
| 3 | 5 | −23.343 |
| 4 | 7 | 7.624 |
| 5 | 9 | −7.565 |

Aspheric data

| | First surface | Second surface | Third surface | Fourth surface | Fifth surface |
|---|---|---|---|---|---|
| k | −1.898E+00 | −1.818E+00 | 0.000E+00 | −2.723E−01 | 0.000E+00 |
| A4 | 3.822E−02 | 1.288E−01 | 4.814E−02 | −8.944E−02 | −1.060E−01 |
| A6 | −2.809E−02 | −1.343E−01 | 6.037E−02 | 2.532E−01 | 5.779E−02 |
| A8 | 4.970E−02 | 1.978E−02 | −1.838E−01 | −3.068E−01 | 1.251E−03 |
| A10 | −5.149E−02 | 3.399E−04 | 1.217E−01 | 2.175E−01 | −3.017E−02 |
| A12 | 4.628E−03 | −6.173E−04 | −1.665E−02 | −5.539E−02 | 6.065E−02 |
| A14 | 4.215E−03 | −5.735E−04 | −5.234E−04 | 3.281E−03 | −1.536E−02 |
| A16 | −3.450E−03 | 8.520E−12 | 2.394E−04 | −6.552E−07 | −2.048E−03 |

| | Sixth surface | Seventh surface | Eighth surface | Ninth surface | Tenth surface |
|---|---|---|---|---|---|
| k | 3.438E+00 | −3.702E+01 | −3.345E+04 | −1.855E+01 | −4.858E+00 |
| A4 | −1.142E−01 | 5.323E−02 | −3.596E−02 | −1.503E−01 | −9.165E−02 |
| A6 | −2.103E−02 | −7.412E−02 | 9.066E−02 | 4.478E−02 | 4.113E−02 |
| A8 | 7.808E−03 | −1.800E−02 | −1.026E−01 | −7.829E−03 | −1.389E−02 |
| A10 | 2.283E−02 | 1.682E−02 | 4.108E−02 | −1.119E−03 | 2.647E−03 |

TABLE 1-continued

Unit mm
f = 4.160
Fno = 2.20
ω(°) = 34.49
IH = 2.856

| A12 | 5.590E−05 | 4.538E−03 | −5.778E−03 | 2.461E−04 | −2.445E−04 |
| A14 | −1.053E−03 | −2.738E−03 | −5.187E−05 | 0.000E+00 | 3.564E−06 |
| A16 | −1.525E−04 | −1.886E−05 | −6.175E−06 | 0.000E+00 | 6.120E−07 |

As shown in Table 5, the imaging lens in the Embodiment 1 satisfies all the conditional expressions (1) to (9).

Figure 2:
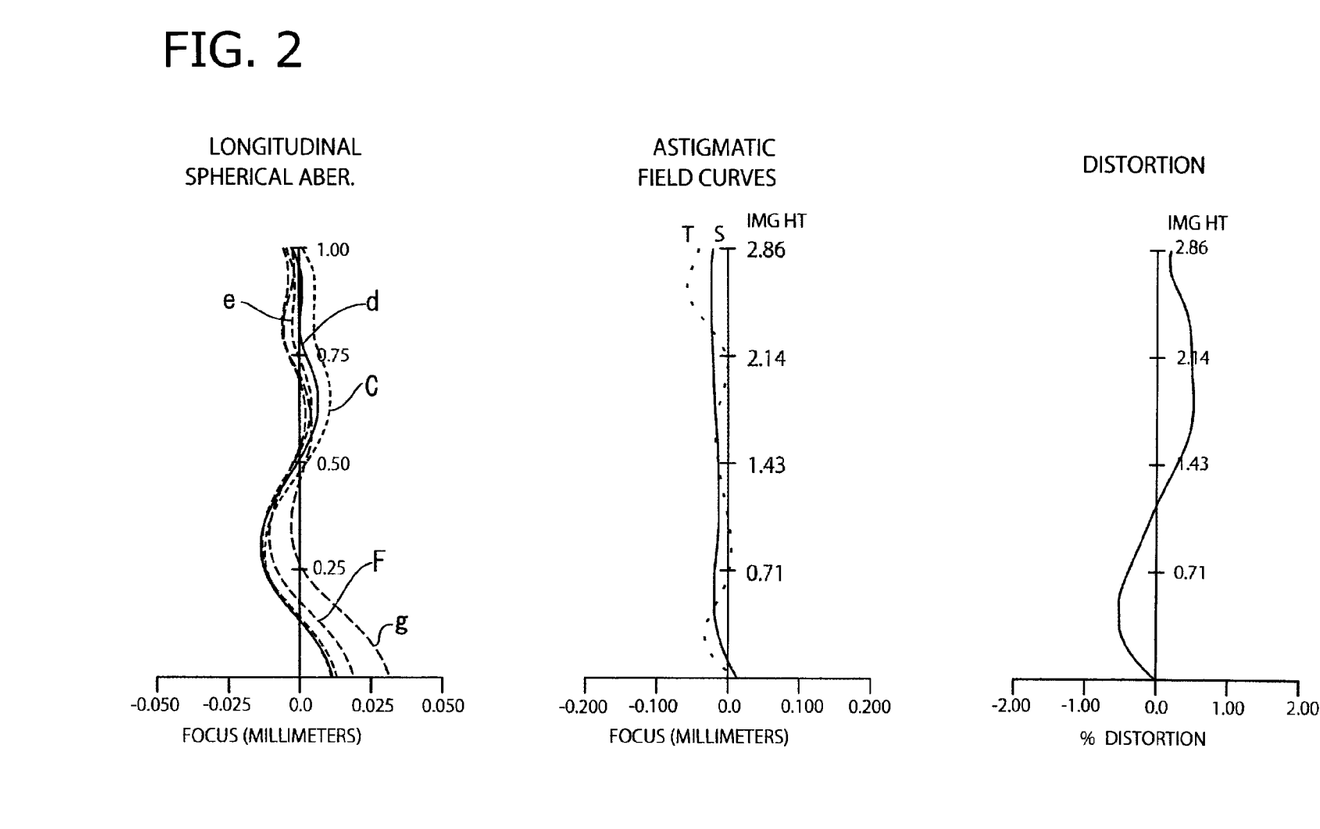
FIG. 2 shows spherical aberration, astigmatism and distortion of the imaging lens according to the Embodiment 1.
Figure 3:
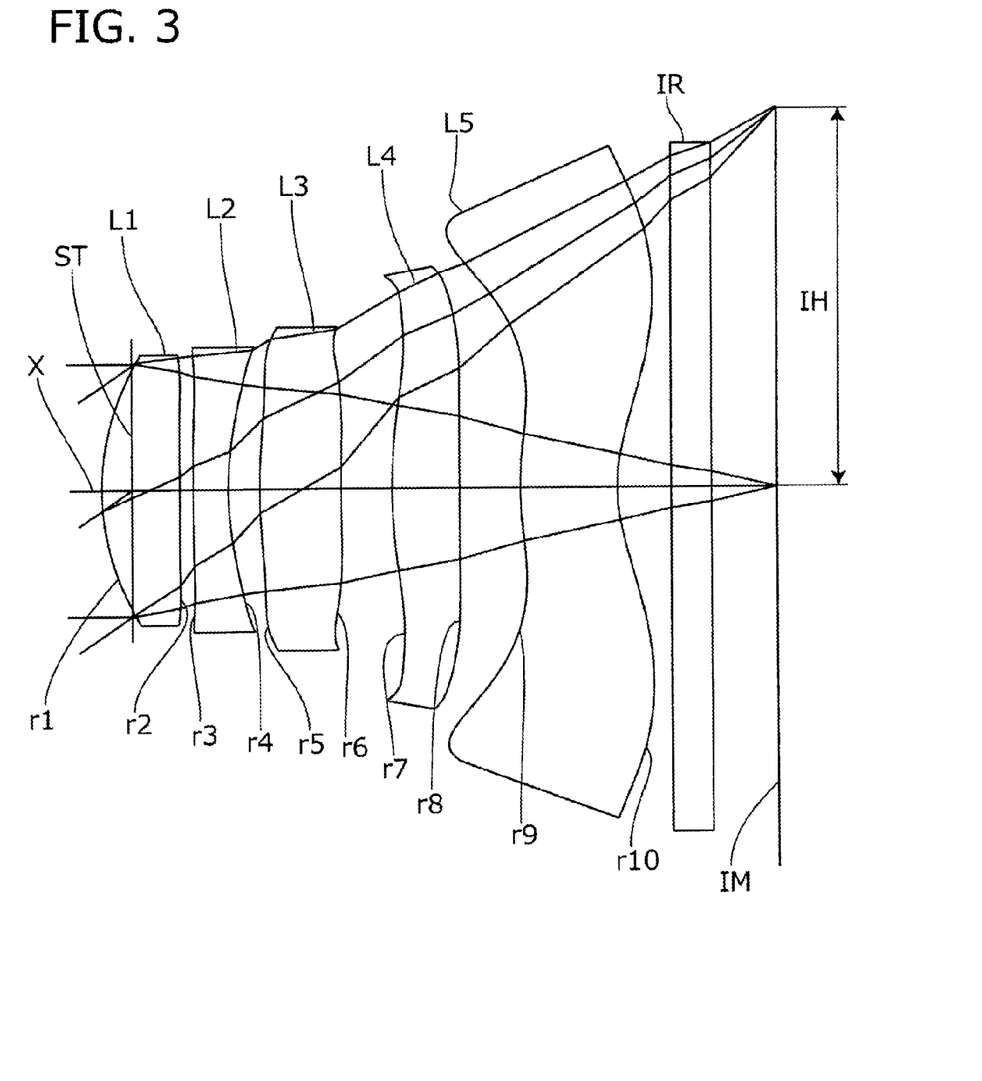
FIG. 3 is a view showing the general configuration of an imaging lens according to Embodiment 2 of the invention.

FIG. 2 shows spherical aberration (mm), astigmatism (mm), and distortion (%) of the imaging lens in the Embodiment 1. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration on sagittal image surface S and the amount of aberration on tangential image surface T. FIG. 2 suggests that aberrations are properly corrected.

The total track length TTL is as short as 4.899 mm and its ratio to maximum image height IH (TTL/2IH) is 0.858, indicating that the imaging lens is thin enough though it is composed of five lenses. In addition, its F-value of 2.20 assures brightness and the half angle of view is relatively wide at about 35 degrees.

Embodiment 2

The basic lens data of the Embodiment 2 is shown below in Table 2.

TABLE 2

Unit mm
f = 4.159
Fno = 2.20
ω(°) = 34.50
IH = 2.856

Surface data

| Surface No. i | Curvature radius r | Surface distance d | Refractive index Nd | Abbe No. vd |
|---|---|---|---|---|
| (Object surface) | Infinity | Infinity | | |
| Stop | Infinity | −0.225 | | |
| 1* | 1.874 | 0.584 | 1.535 | 56.16 |
| 2* | −21.965 | 0.100 | | |
| 3* | 33.438 | 0.260 | 1.635 | 23.91 |
| 4* | 2.343 | 0.238 | | |
| 5* | 3.866 | 0.610 | 1.535 | 56.16 |
| 6* | 11.067 | 0.386 | | |
| 7* | 4.133 | 0.505 | 1.535 | 56.16 |
| 8* | 41.270 | 0.460 | | |
| 9* | 2.315 | 0.723 | 1.535 | 56.16 |
| 10* | 1.261 | 0.4 | | |
| 11 | Infinity | 0.3 | 1.517 | 64.20 |
| 12 | Infinity | 0.486 | | |
| Image plane | Infinity | | | |

Single lens data

| Lens | Start plane | Focal length |
|---|---|---|
| 1 | 1 | 3.244 |
| 2 | 3 | −3.939 |
| 3 | 5 | 10.749 |
| 4 | 7 | 8.515 |
| 5 | 9 | −6.788 |

Aspheric data

| | First surface | Second surface | Third surface | Fourth surface | Fifth surface |
|---|---|---|---|---|---|
| k | −1.886E+00 | 4.388E+02 | 3.059E−02 | −1.458E+00 | 0.000E+00 |
| A4 | 3.969E−02 | 1.085E−01 | 3.059E−02 | −1.085E−01 | −1.362E−01 |
| A6 | −2.319E−02 | −1.011E−01 | 3.157E−02 | 2.070E−01 | 3.780E−02 |
| A8 | 5.384E−02 | 2.255E−02 | −1.821E−01 | −3.220E−01 | 4.319E−03 |
| A10 | −4.879E−02 | −1.427E−02 | 1.166E−01 | 2.360E−01 | −2.479E−02 |
| A12 | 3.911E−03 | −2.987E−03 | −1.491E−02 | −5.626E−02 | 6.121E−02 |
| A14 | 5.711E−03 | 4.239E−03 | 1.644E−03 | 2.691E−03 | −1.878E−02 |
| A16 | −8.275E−04 | 6.893E−03 | 2.378E−03 | 7.048E−05 | −3.516E−03 |

TABLE 2-continued

Unit mm
f = 4.159
Fno = 2.20
ω(°) = 34.50
IH = 2.856

|     | Sixth surface | Seventh surface | Eighth surface | Ninth surface | Tenth surface |
|-----|---------------|-----------------|----------------|---------------|---------------|
| k   | 2.833E+01     | -2.537E+01      | -7.621E+04     | -1.432E+01    | -4.589E+00    |
| A4  | -1.136E-01    | 4.457E-02       | -2.654E-02     | -1.977E-01    | -1.031E-01    |
| A6  | -2.293E-03    | -4.656E-02      | 8.015E-02      | 7.206E-02     | 4.359E-02     |
| A8  | -1.024E-03    | -2.172E-02      | -9.668E-02     | -1.899E-02    | -1.337E-02    |
| A10 | 2.075E-02     | 1.441E-02       | 4.170E-02      | 2.427E-03     | 2.537E-03     |
| A12 | 3.672E-03     | 4.481E-03       | -6.034E-03     | 0.000E+00     | -2.484E-04    |
| A14 | 0.000E+00     | -2.487E-03      | -1.193E-04     | 0.000E+00     | 5.549E-06     |
| A16 | -8.156E-04    | 5.868E-05       | 1.723E-05      | 0.000E+00     | 5.752E-07     |

As shown in Table 5, the imaging lens in the Embodiment 2 satisfies all the conditional expressions (1) to (9).

Figure 4:
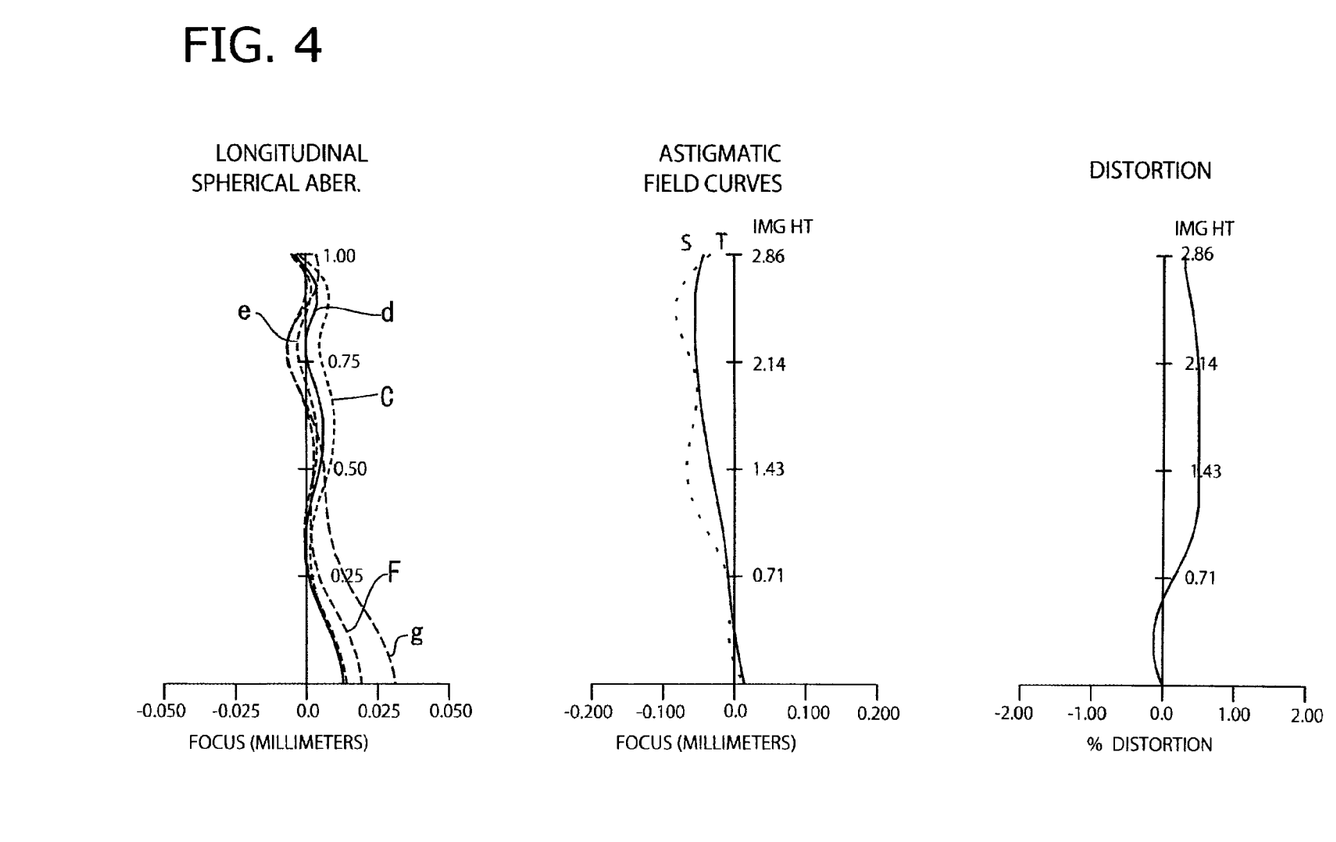
FIG. 4 shows spherical aberration, astigmatism and distortion of the imaging lens according to the Embodiment 2.
Figure 5:
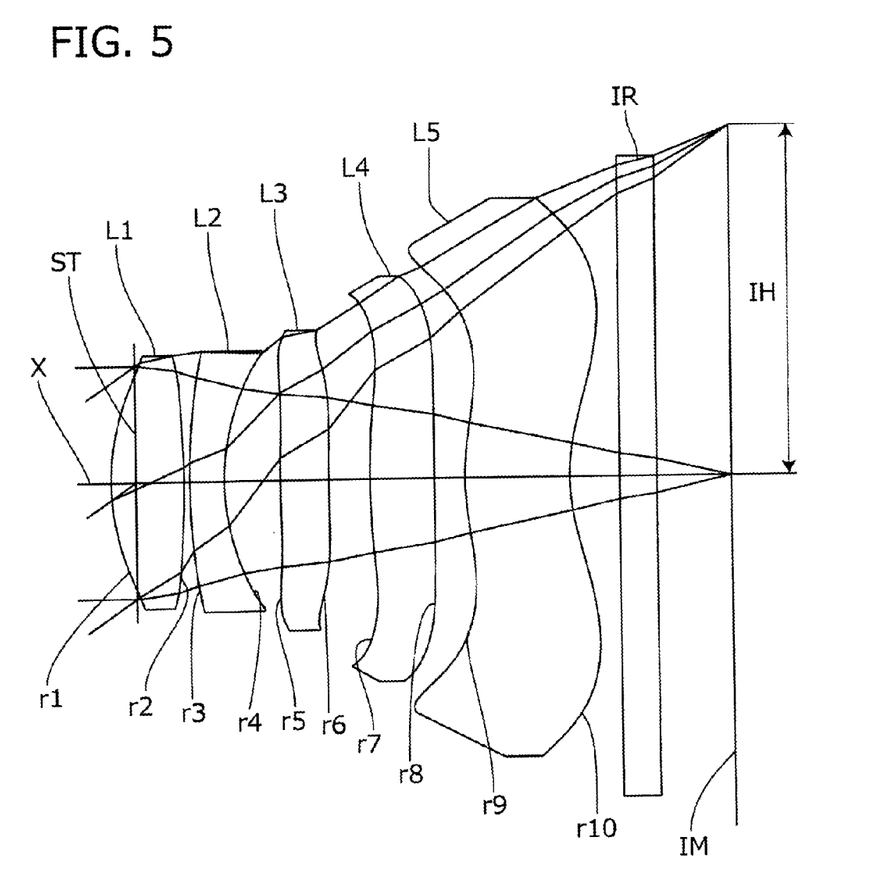
FIG. 5 is a view showing the general configuration of an imaging lens according to Embodiment 3 of the invention.

FIG. 4 shows spherical aberration (mm), astigmatism (mm), and distortion (%) of the imaging lens in the Embodiment 2. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration on sagittal image surface S and the amount of aberration on tangential image surface T. FIG. 4 suggests that aberrations are properly corrected.

The total track length TTL is as short as 4.962 mm and its ratio to maximum image height IH (TTL/2IH) is 0.869, indicating that the imaging lens is thin enough though it is composed of five lenses. In addition, its F-value of 2.20 assures brightness and the half angle of view is relatively wide at about 35 degrees.

Embodiment 3

The basic lens data of the Embodiment 3 is shown below in Table 3.

TABLE 3

Unit mm
f = 4.142
Fno = 2.20
ω(°) = 34.75
IH = 2.856

| Surface data ||||| |
|---|---|---|---|---|
| Surface No. i | Curvature radius r | Surface distance d | Refractive index Nd | Abbe No. vd |
| (Object surface) | Infinity | Infinity | | |
| Stop | Infinity | -0.200 | | |
| 1* | 1.872 | 0.591 | 1.535 | 56.16 |
| 2* | -5.548 | 0.047 | | |
| 3* | 6.355 | 0.276 | 1.635 | 23.91 |
| 4* | 1.710 | 0.458 | | |
| 5* | 8.500 | 0.392 | 1.535 | 56.16 |
| 6* | 9.600 | 0.338 | | |
| 7* | 7.528 | 0.523 | 1.535 | 56.16 |
| 8* | 736.753 | 0.248 | | |
| 9* | 1.973 | 0.848 | 1.535 | 56.16 |
| 10* | 1.509 | 0.4 | | |
| 11 | Infinity | 0.3 | 1.517 | 64.20 |
| 12 | Infinity | 0.600 | | |
| Image plane | Infinity | | | |

| Single lens data |||
|---|---|---|
| Lens | Start plane | Focal length |
| 1 | 1 | 2.682 |
| 2 | 3 | -3.733 |
| 3 | 5 | 122.879 |
| 4 | 7 | 14.164 |
| 5 | 9 | -33.034 |

| Aspheric data |||||
|---|---|---|---|---|
| | First surface | Second surface | Third surface | Fourth surface | Fifth surface |
| k | -2.217E+00 | 0.000E+00 | 0.000E+00 | -9.585E-01 | 0.000E+00 |
| A4 | 3.626E-02 | 1.141E-01 | 2.186E-02 | -9.693E-02 | -1.324E-01 |

TABLE 3-continued

Unit mm
f = 4.142
Fno = 2.20
ω(°) = 34.75
IH = 2.856

|  |  |  |  |  |  |
|---|---|---|---|---|---|
| A6 | −2.837E−02 | −1.313E−01 | 5.007E−02 | 2.423E−01 | 5.992E−02 |
| A8 | 3.465E−02 | 4.347E−02 | −1.746E−01 | −3.158E−01 | 3.496E−03 |
| A10 | −3.540E−02 | −1.263E−02 | 1.461E−01 | 2.226E−01 | −3.148E−02 |
| A12 | 0.000E+00 | 0.000E+00 | −3.230E−02 | −5.368E−02 | 5.376E−02 |
| A14 | 0.000E+00 | 0.000E+00 | 0.000E+00 | 0.000E+00 | −1.885E−02 |
| A16 | 0.000E+00 | 0.000E+00 | 0.000E+00 | 0.000E+00 | 0.000E+00 |

|  | Sixth surface | Seventh surface | Eighth surface | Ninth surface | Tenth surface |
|---|---|---|---|---|---|
| k | −2.594E+02 | −3.680E+01 | 0.000E+00 | 0.000E+00 | −2.505E+00 |
| A4 | −1.128E−01 | 5.806E−02 | −4.213E−02 | −2.636E−01 | −1.306E−01 |
| A6 | −1.993E−02 | −6.128E−02 | 1.010E−01 | 8.066E−02 | 4.791E−02 |
| A8 | 7.347E−03 | −2.306E−02 | −1.037E−01 | −1.206E−02 | −1.380E−02 |
| A10 | 2.043E−02 | 1.553E−02 | 4.024E−02 | −3.810E−03 | 2.514E−03 |
| A12 | 0.000E+00 | 4.864E−03 | −5.715E−03 | 9.779E−04 | −2.677E−04 |
| A14 | 0.000E+00 | −2.728E−03 | 0.000E+00 | 0.000E+00 | 8.035E−06 |
| A16 | 0.000E+00 | 0.000E+00 | 0.000E+00 | 0.000E+00 | 7.957E−07 |

As shown in Table 5, the imaging lens in the Embodiment 3 satisfies all the conditional expressions (1) to (9).

Figure 6:
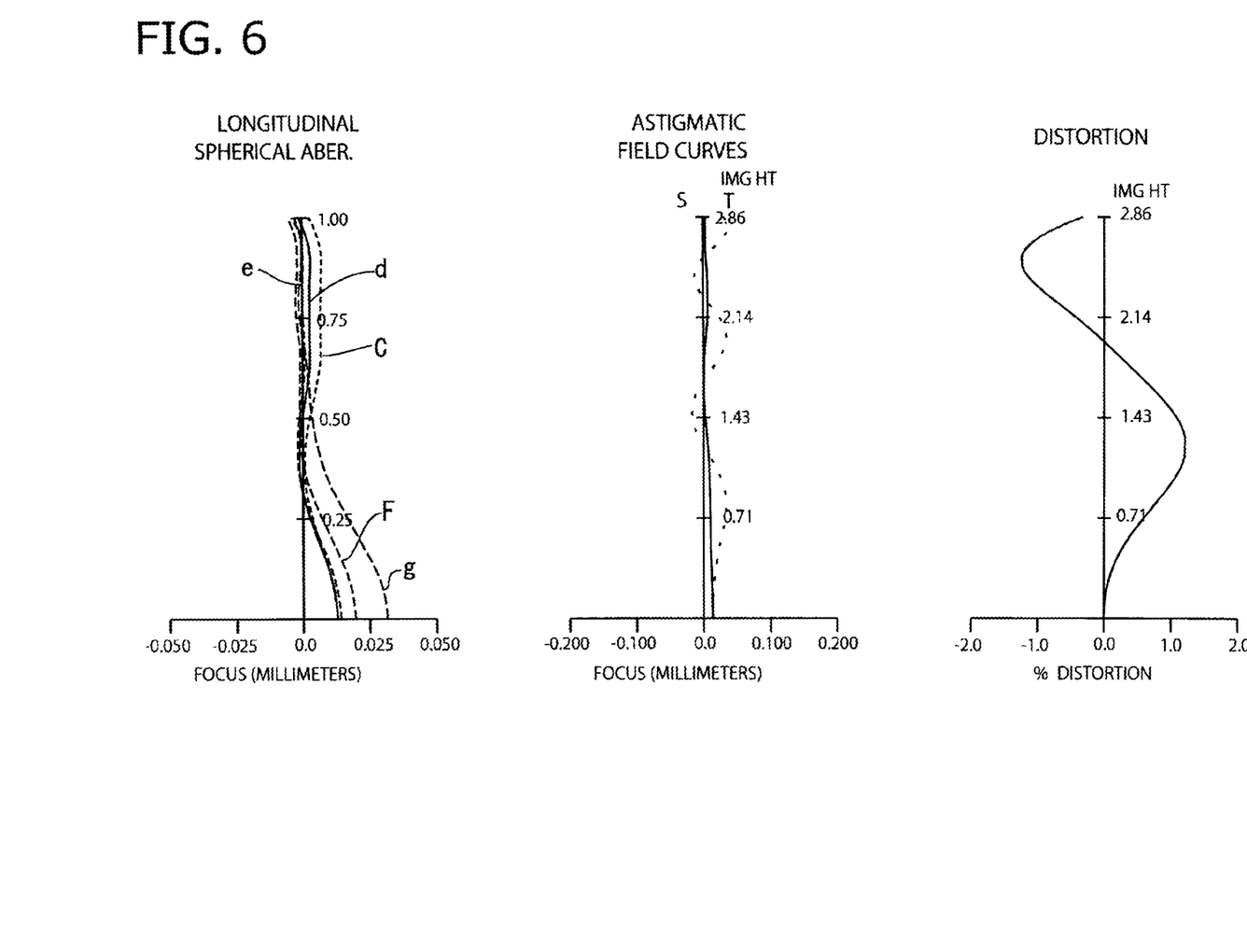
FIG. 6 shows spherical aberration, astigmatism and distortion of the imaging lens according to the Embodiment 3.
Figure 7:
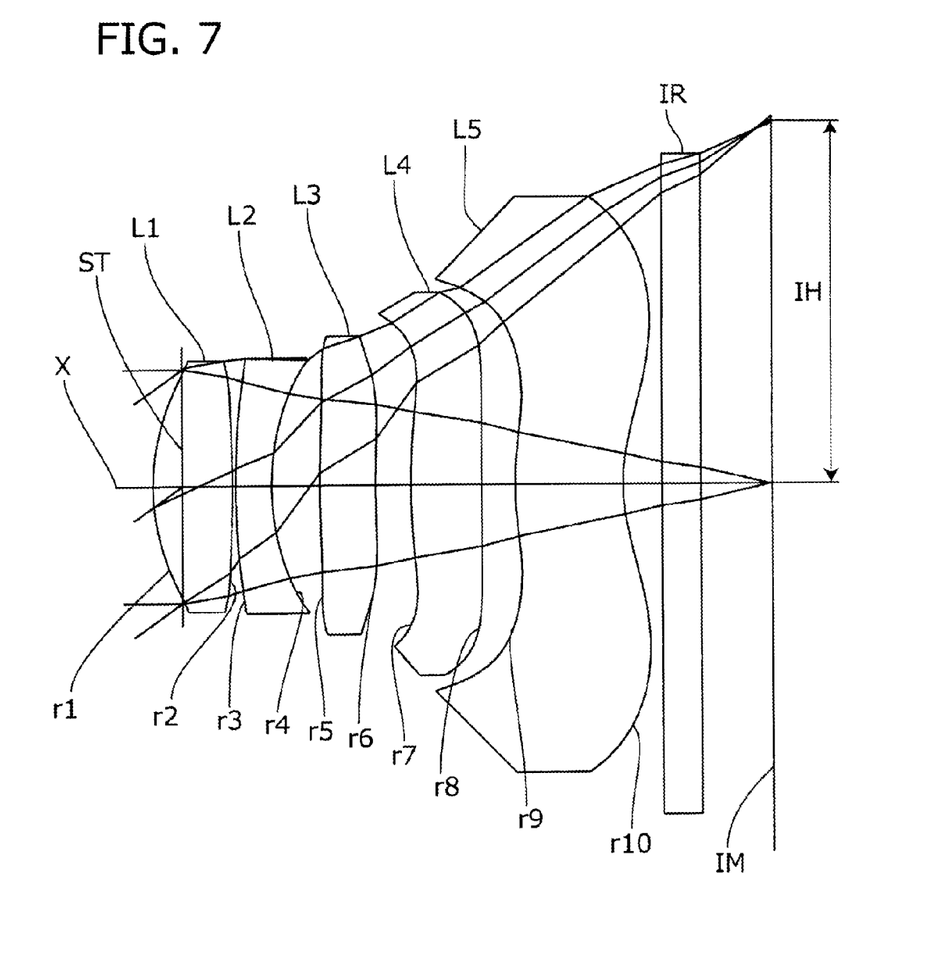
FIG. 7 is a view showing the general configuration of an imaging lens according to Embodiment 4 of the invention.

FIG. 6 shows spherical aberration (mm), astigmatism (mm), and distortion (%) of the imaging lens in the Embodiment 3. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration on sagittal image surface S and the amount of aberration on tangential image surface T. FIG. 6 suggests that aberrations are properly corrected.

The total track length TTL is as short as 4.931 mm and its ratio to maximum image height IH (TTL/2IH) is 0.863, indicating that the imaging lens is thin enough though it is composed of five lenses. In addition, its F-value of 2.20 assures brightness and the half angle of view is relatively wide at about 35 degrees.

Embodiment 4

The basic lens data of the Embodiment 4 is shown below in Table 4.

TABLE 4

Unit mm
f = 4.000
Fno = 2.20
ω(°) = 35.54
IH = 2.856

| Surface data | | | | |
|---|---|---|---|---|
| Surface No. i | Curvature radius r | Surface distance d | Refractive index Nd | Abbe No. vd |
| (Object surface) | Infinity | Infinity | | |
| Stop | Infinity | −0.225 | | |
| 1* | 1.714 | 0.617 | 1.535 | 56.16 |
| 2* | −7.181 | 0.023 | | |
| 3* | 7.867 | 0.280 | 1.635 | 23.91 |
| 4* | 1.864 | 0.377 | | |
| 5* | 6.208 | 0.436 | 1.535 | 56.16 |
| 6* | 7.014 | 0.278 | | |
| 7* | 6.053 | 0.550 | 1.535 | 56.16 |
| 8* | 50.000 | 0.263 | | |
| 9* | 2.227 | 0.840 | 1.535 | 56.16 |
| 10* | 1.456 | 0.3 | | |
| 11 | Infinity | 0.3 | 1.517 | 64.20 |
| 12 | Infinity | 0.550 | | |
| Image plane | Infinity | | | |

| Single lens data | | |
|---|---|---|
| Lens | Start plane | Focal length |
| 1 | 1 | 2.652 |
| 2 | 3 | −3.916 |
| 3 | 5 | 85.058 |
| 4 | 7 | 12.825 |
| 5 | 9 | −12.688 |

TABLE 4-continued

Unit mm
f = 4.000
Fno = 2.20
ω(°) = 35.54
IH = 2.856

Aspheric data

|     | First surface | Second surface | Third surface | Fourth surface | Fifth surface |
|-----|---------------|----------------|---------------|----------------|---------------|
| k   | −1.660E+00    | 0.000E+00      | 0.000E+00     | −3.348E−01     | 0.000E+00     |
| A4  | 3.944E−02     | 1.223E−01      | 4.176E−02     | −9.291E−02     | −1.365E−01    |
| A6  | −3.645E−02    | −1.438E−01     | 4.942E−02     | 2.739E−01      | 8.053E−02     |
| A8  | 5.301E−02     | 5.707E−03      | −1.905E−01    | −3.065E−01     | 7.214E−03     |
| A10 | −5.023E−02    | 1.473E−02      | 1.167E−01     | 1.623E−01      | −4.762E−02    |
| A12 | 0.000E+00     | 0.000E+00      | 1.130E−03     | −1.734E−02     | 5.334E−02     |
| A14 | 0.000E+00     | 0.000E+00      | 0.000E+00     | 0.000E+00      | −1.668E−02    |
| A16 | 0.000E+00     | 0.000E+00      | 0.000E+00     | 0.000E+00      | 0.000E+00     |

|     | Sixth surface | Seventh surface | Eighth surface | Ninth surface | Tenth surface |
|-----|---------------|-----------------|----------------|---------------|---------------|
| k   | −8.949E+01    | −2.128E+01      | 0.000E+00      | 0.000E+00     | −3.428E+00    |
| A4  | −1.148E−01    | 5.853E−02       | −4.184E−02     | −3.015E−01    | −1.315E−01    |
| A6  | −3.033E−02    | −9.973E−02      | 9.287E−02      | 9.151E−02     | 5.033E−02     |
| A8  | 1.765E−03     | −1.736E−02      | −1.040E−01     | −4.778E−03    | −1.433E−02    |
| A10 | 2.057E−02     | 1.296E−02       | 4.104E−02      | −4.021E−03    | 2.562E−03     |
| A12 | 0.000E+00     | 9.310E−04       | −6.824E−03     | −6.595E−04    | −2.475E−04    |
| A14 | 0.000E+00     | −1.363E−03      | 0.000E+00      | 0.000E+00     | 4.770E−06     |
| A16 | 0.000E+00     | 0.000E+00       | 0.000E+00      | 0.000E+00     | 6.120E−07     |

As shown in Table 5, the imaging lens in the Embodiment 4 satisfies all the conditional expressions (1) to (9).

Figure 8:
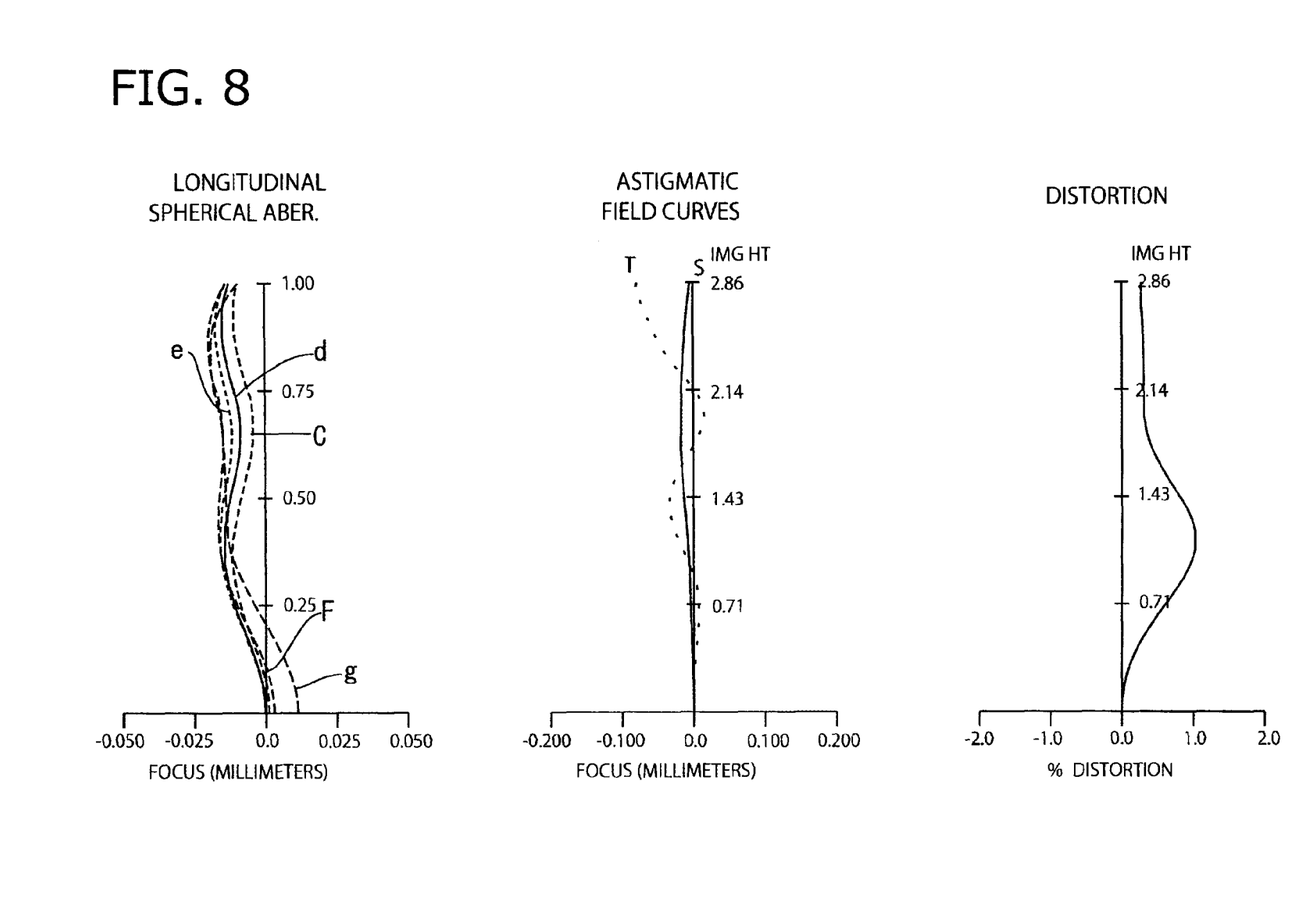
FIG. 8 shows spherical aberration, astigmatism and distortion of the imaging lens according to the Embodiment 4.

FIG. 8 shows spherical aberration (mm), astigmatism (mm), and distortion (%) of the imaging lens in the Embodiment 4. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration on sagittal image surface S and the amount of aberration on tangential image surface T. FIG. 8 suggests that aberrations are properly corrected.

The total track length TTL is as short as 4.712 mm and its ratio to maximum image height IH (TTL/2IH) is 0.825, indicating that the imaging lens is thin enough though it is composed of five lenses. In addition, its F-value of 2.20 assures brightness, and the half angle of view is relatively wide at about 35 degrees.

It is known that the imaging lenses according to the preferred embodiments of the present invention achieve a ratio of total track length to maximum image height (TTL/2IH) of about 0.85 and their total track length is short though they are each composed of five lenses. Furthermore, their F-value of about 2.20 assures brightness and their half angle of view ω is about 35 degrees so that imaging can be performed with a relatively wide angle of view and aberrations are corrected properly.

Table 5 shows data on the Embodiments 1 to 4 relating to the conditional expressions (1) to (9).

TABLE 5

|    | Embodiment 1 | Embodiment 2 | Embodiment 3 | Embodiment 4 |
|----|--------------|--------------|--------------|--------------|
| f  | 4.160        | 4.159        | 4.142        | 4.000        |
| f1 | 2.533        | 3.244        | 2.682        | 2.652        |
| f2 | −3.746       | −3.939       | −3.733       | −3.916       |
| f3 | −23.343      | 10.749       | 122.879      | 85.058       |

TABLE 5-continued

|    | | | | |
|----|---|---|---|---|
| f4 | 7.624 | 8.515 | 14.164 | 12.825 |
| f5 | −7.565 | −6.788 | −33.034 | −12.688 |
| v1 | 56.16 | 56.16 | 56.16 | 56.16 |
| v2 | 23.91 | 23.91 | 23.91 | 23.91 |
| TTL | 4.899 | 4.962 | 4.931 | 4.712 |
| r1 | 1.754 | 1.874 | 1.872 | 1.714 |
| r2 | −5.259 | −21.965 | −5.548 | −7.181 |
| IH | 2.856 | 2.856 | 2.856 | 2.856 |
| ω | 34.49 | 34.499 | 34.750 | 35.536 |
| Fno | 2.20 | 2.20 | 2.20 | 2.20 |

| Value of conditional expressions | | | | |
|---|---|---|---|---|
| (1) 45 < v1 < 90 | 56.16 | 56.16 | 56.16 | 56.16 |
| (2) 22 < v2 < 35 | 23.91 | 23.91 | 23.91 | 23.91 |
| (3) 2.0 < v1/v2 < 2.6 | 2.349 | 2.349 | 2.349 | 2.349 |
| (4) 0.6 < f1/f < 0.9 | 0.609 | 0.780 | 0.648 | 0.663 |
| (5) −1.0 < f2/f < −0.8 | −0.901 | −0.947 | −0.901 | −0.979 |
| (6) 1.1 < TTL/f < 1.3 | 1.178 | 1.193 | 1.191 | 1.178 |
| (7) −0.40 < r1/r2 < −0.08 | −0.334 | −0.085 | −0.337 | −0.239 |
| (8) 1.6 < f4/f < 3.8 | 1.833 | 2.047 | 3.420 | 3.207 |
| (9) −9.0 < f5/f < −1.4 | −1.819 | −1.632 | −7.976 | −3.173 |
| TTL/2IH | 0.858 | 0.869 | 0.863 | 0.825 |

As explained so far, when the imaging lenses composed of five lenses according to the aforementioned Embodiments are used for optical systems which are built in mobile terminals such as mobile phones and smart phones, PDAs (Personal Digital Assistances) and image pickup devices mounted in game machines or the like, their camera system is able to provide high performance and also achieve compactness.

The effects of the present invention are as follows.

According to the present invention, it is attainable to provide an imaging lens which corrects various aberrations properly and provides a relatively wide angle of view and brightness in response to the need for compactness and thinness.

Since all the constituent lenses are made of plastic material, an imaging lens suitable for mass production is obtainable at low cost.

What is claimed is:

1. An imaging lens composed of five lenses for a solid-state image sensor which are arranged in order from an object side to an image side, comprising:
   a first lens with positive refractive power having a convex surface on the object side; and
   a second lens with negative refractive power having a concave surface on the image side, the first lens and the second lens satisfying conditional expressions (1), (2), and (3) below:

$$45 < v1 < 90 \quad (1)$$

$$22 < v2 < 35 \quad (2)$$

$$2.0 < v1/v2 < 2.6 \quad (3)$$

where
   v1: Abbe number of the first lens
   v2: Abbe number of the second lens, and
   further comprising:
   a third lens with positive or negative refractive power having a meniscus shape with a concave surface on the image side and a convex surface on the object side near the optical axis;
   a fourth lens with positive refractive power as a double-sided aspheric lens, having a concave surface on the image side near an optical axis; and
   a fifth lens with negative refractive power as a double-sided aspheric lens, having a concave surface on the image side near the optical axis.

2. The imaging lens according to claim 1, wherein a conditional expression (4) below is satisfied:

$$0.6 < f1/f < 0.9 \quad (4)$$

where
   f: focal length of an overall optical system of the imaging lens
   f1: focal length of the first lens.

3. The imaging lens according to claim 2, wherein a conditional expression (5) below is satisfied:

$$-1.0 < f2/f < -0.8 \quad (5)$$

where
   f2: focal length of the second lens.

4. The imaging lens according to claim 3, wherein an aperture stop is located on the object side of the first lens.

5. The imaging lens according to claim 3, wherein a conditional expression (8) below is satisfied:

$$1.6 < f4/f < 3.8 \quad (8)$$

where
   f4: focal length of the fourth lens.

6. The imaging lens according to claim 5, wherein a conditional expression (9) below is satisfied:

$$-9.0 < f5/f < -1.4 \quad (9)$$

where
   f5: focal length of the fifth lens.

7. The imaging lens according to claim 1, wherein a conditional expression (5) below is satisfied:

$$-1.0 < f2/f < -0.8 \quad (5)$$

where
   f: focal length of an overall optical system of the imaging lens
   f2: focal length of the second lens.

8. The imaging lens according to claim 7, wherein an aperture stop is located on the object side of the first lens.

9. The imaging lens according to claim 7, wherein a conditional expression (8) below is satisfied:

$$1.6 < f4/f < 3.8 \quad (8)$$

where
   f4: focal length of the fourth lens.

10. The imaging lens according to claim 9, wherein a conditional expression (9) below is satisfied:

$$-9.0 < f5/f < -1.4 \quad (9)$$

where
    f5: focal length of the fifth lens.

11. The imaging lens according to claim 1, wherein the fourth lens and the fifth lens have a meniscus shape with a concave surface on the image side near the optical axis and have a pole-change point off the optical axis on the object side surface and the image side surface.

12. The imaging lens according to claim 1, wherein a conditional expression (6) below is satisfied:

$$1.1 < TTL/f < 1.3 \quad (6)$$

where
    f: focal length of an overall optical system of the imaging lens
    TTL: distance on the optical axis from the object side surface of the first lens to an image plane without a filter.

13. The imaging lens according to claim 1, wherein the first lens is a biconvex lens and a conditional expression (7) below is satisfied:

$$-0.40 < r1/r2 < -0.08 \quad (7)$$

where
    r1: curvature radius of the object side surface of the first lens
    r2: curvature radius of the image side surface of the first lens.

14. The imaging lens according to claim 1, wherein the first lens, the second lens, the third lens, the fourth lens, and the fifth lens are made of plastic material and cycloolefin plastic material is used for the first lens, the third lens, the fourth lens, and the fifth lens and polycarbonate is used for the second lens.

* * * * *